(No Model.)
W. WIRTZ.
APPARATUS FOR PASTEURIZATION OF BEER.
No. 546,393. Patented Sept. 17, 1895.
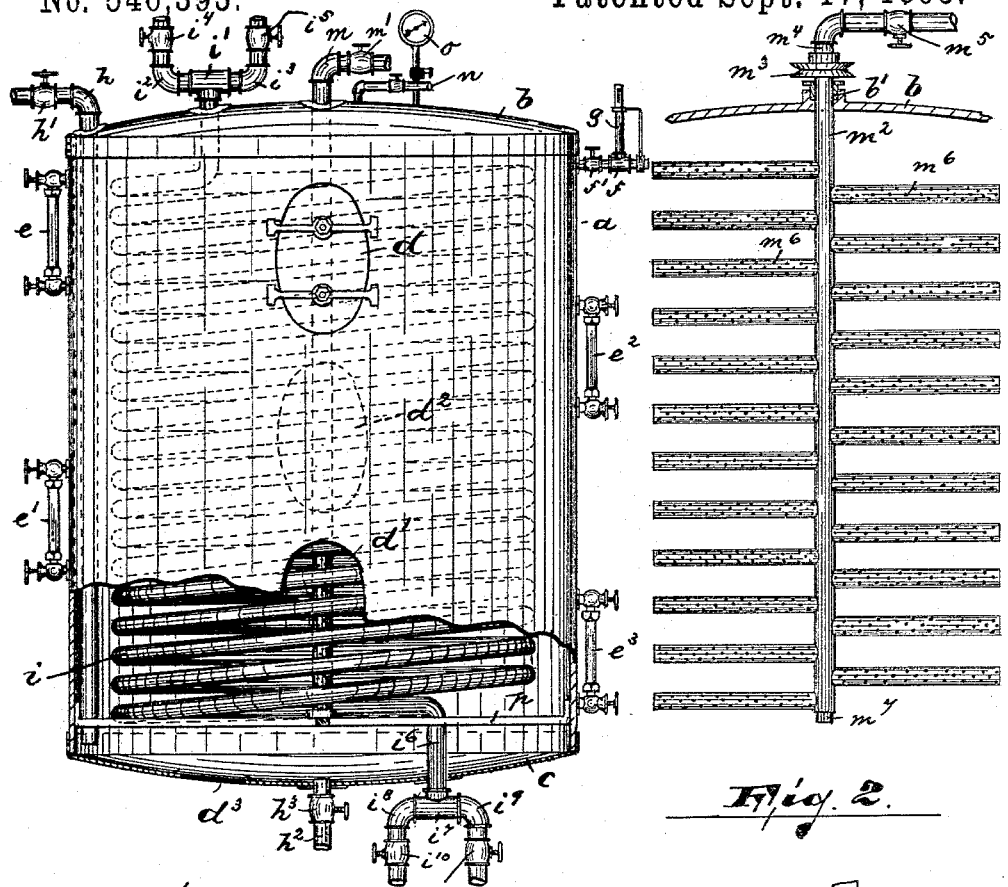
Fig. 2.
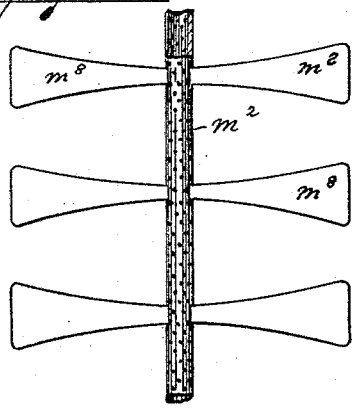
Fig. 1.
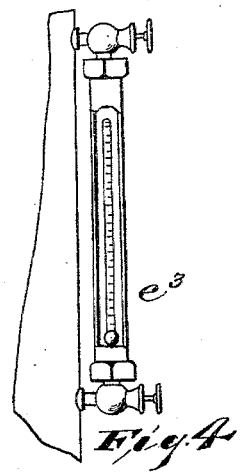
Fig. 3.
Fig. 4.
WITNESSES:
Arthur H. Thomson
Duncan M. Robertson
INVENTOR:
William Wirtz
BY Gartner & Co
ATTORNEYS

UNITED STATES PATENT OFFICE.

WILLIAM WIRTZ, OF NEWARK, NEW JERSEY.

APPARATUS FOR PASTEURIZATION OF BEER.

SPECIFICATION forming part of Letters Patent No. 546,393, dated September 17, 1895.

Application filed May 8, 1895. Serial No. 648,509. (No model.)

*To all whom it may concern:*

Be it known that I, WILLIAM WIRTZ, a citizen of the United States, residing in Newark, county of Essex, and State of New Jersey, have invented certain new and useful Improvements in Apparatus for the Pasteurization of Beer; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my present invention is to provide an apparatus for the pasteurization of beer of simple, strong, and durable construction, reliable in operation, and easily controllable.

The invention consists in the improved apparatus for the pasteurization of beer, and in the combination and arrangement of the various parts, substantially as will be hereinafter more fully described and finally embodied in the clauses of the claim.

Referring to the accompanying drawings, in which like letters of reference indicate corresponding parts in each of the several figures, Figure 1 illustrates in elevation my improved apparatus, certain portions being broken away; Fig. 2, a detail view of a certain stirring apparatus; Fig. 3, a detail view of a modified form of the same; and Fig. 4, an enlarged detail view, partly in section, of one of the thermometer's inclosing tubes, showing the thermometer proper.

In said drawings, $a$ represents a receptacle (by preference cylindrical in cross section) and $b$ and $c$ its top and bottom, respectively. A series of manholes $d$, $d^2$, and $d'$, of the latter a portion only being shown, are arranged alternately and diametrically opposite in the side wall of said receptacle, while a manhole $d^3$ is arranged in the bottom $c$, all as clearly shown in Fig. 1 of the drawings.

To the side of the receptacle are secured a series of thermometers $e$, $e'$, $e^2$, and $e^3$, arranged alternately and diametrically opposite. Each of said thermometers is arranged in a tube communicating with the receptacle and provided with stop-cocks for the purpose of closing said communications when necessary. Near the top $b$ and communicating with the side of receptacle $a$ is arranged a tube $f$ with stop-cock $f'$, carrying a tube $g$ acting as a high-level gage for the liquid in said receptacle. In the receptacle is supported a pipe-coil $i$, penetrating the top $b$ and bottom $c$ and terminating in T-joints $i'$ and $i^7$, respectively. Pipes $i^2$ and $i^3$ with respective stop-cocks $i^4$ and $i^5$ branch from the T-joint $i'$, while pipes $i^8$ and $i^9$ with respective stop-cocks $i^{10}$ and $i^{11}$ branch from the T-joint $i^7$.

The pipes $i^2$ and $i^8$ form the inlet and outlet, respectively, for steam to be passed through the coil $i$, while the pipes $i^3$ and $i^9$ form the inlet and outlet for cold air to be forced through the coil, after the steam has performed its duty, and the passage of the same interrupted by the closing of the cocks $i^4$ and $i^{10}$. A supply-pipe $h$ with stop-cock $h'$ (or a series of supply-pipes) penetrates the top $b$ and extends downward to near the bottom of the receptacle $a$, while the discharge-pipe $h^2$ with stop-cock $h^3$ communicates with the bottom thereof, as clearly shown. The supply-pipe $h$ can also be used as a flushing-pipe for cleaning the inside of the receptacle, as will be manifest. An air-vent $n$ and a pressure-gage $o$ are arranged on the top $b$ of the receptacle, for purposes hereinafter described.

Vertically arranged in the center of the receptacle is a tube $m$, provided with a series of perforations, and is also provided at its exposed portion with a stop-cock $m'$. The lower portion of said perforated tube rests on the bearing arranged on the bridge or spider $p$. Said tube is for the purpose of carrying carbonic-acid gas into the beer to be carbonated.

In Fig. 2 I have illustrated the top $b$ of the receptacle with a bearing and bushing $b'$ for the downwardly-extending tube $m^2$, which in that case is adapted to be revolved by means of pulley $m^3$, and which tube is provided at the portion inclosed in the receptacle with a series of substantially horrizontally-arranged perforated tubes $m^6$ (closed at their outer ends) and adapted to deliver carbonic-acid gas into the beer and also during the process of steaming to be revolved with the tube $m^2$, and thus to stir or agitate the liquid.

In Fig. 3 of the drawings the downwardly-extending tube $m^2$, which in that case is perforated, is provided with a series of blades $m^3$ for the same purpose as above described.

In operation the beer to be pasteurized is admitted through pipe $h$ into the receptacle $a$ and is allowed to rise therein to within a short distance (say two to four inches) of the top, when it will thus indicate on the gage $g$. The supply of beer into the receptacle is now shut off by means of the cock $h'$ and the steam admitted into the coil $i$ (the cocks $i^5$ and $i^{11}$ being closed and also the air-vent $n$ and the stopcock $f'$.) When the beer has reached the required temperature, (which easily can be seen by the thermometer, and its pressure by the indicator $o$,) the cocks $i^4$ and $i^{10}$ are closed and the cocks $i^5$ and $i^{11}$ opened, thus allowing cold air to be forced through the coil, and thus gradually cooling the beer to the minimum temperature required. Carbonic-acid gas is now admitted through the tube $m$ into the beer until the latter has absorbed sufficient from said gas. The beer is now thoroughly pasteurized and carbonated and is discharged through the tube $h^2$ into the barrels.

In certain cases the stirring device illustrated in Figs. 2 and 3 is used, and operated during the processes of steaming and cooling.

It will be manifest that the apparatus above described can also be used for sterilizing milk and other liquids.

Having thus described my invention, what I claim as new, and desire to secure by Letters Patent, is—

In an apparatus for pasteurizing, the combination with the receptacle, of a pipe coil in said receptacle and penetrating the top and bottom thereof, a T-joint on the inlet and outlet of said coil, two valve controlled pipes branching off each T-joint, a supply pipe penetrating the top of the receptacle and extending downward to near the bottom thereof, an outlet arranged in the bottom, an air vent in the top, a bearing and bushing in the center of the top of the receptacle, a brace traversing the receptacle near its bottom and provided with a centrally arranged bearing, a perforated tube adapted to revolve in said bearings, a series of horizontally arranged blades on said tube, a series of manholes alternately arranged on the side of the receptacle, a series of valve controlled tubes, on the side of the receptacle arranged alternately and diametrically opposite each other and communicating with said receptacle, and a thermometer in each of said tubes, all said parts, substantially as and for the purposes described.

In testimony that I claim the foregoing I have hereunto set my hand this 7th day of May, 1895.

WILLIAM WIRTZ.

Witnesses:
ALFRED GARTNER,
WM. D. BELL.